Dec. 18, 1928.
J. S. MILLER
GEAR SHIFT
Filed Nov. 21, 1927
1,696,049
2 Sheets-Sheet 1
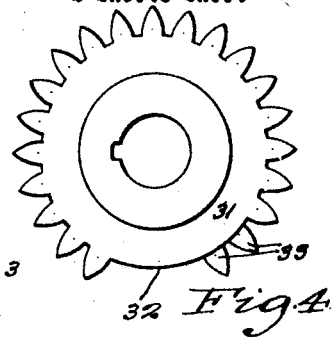
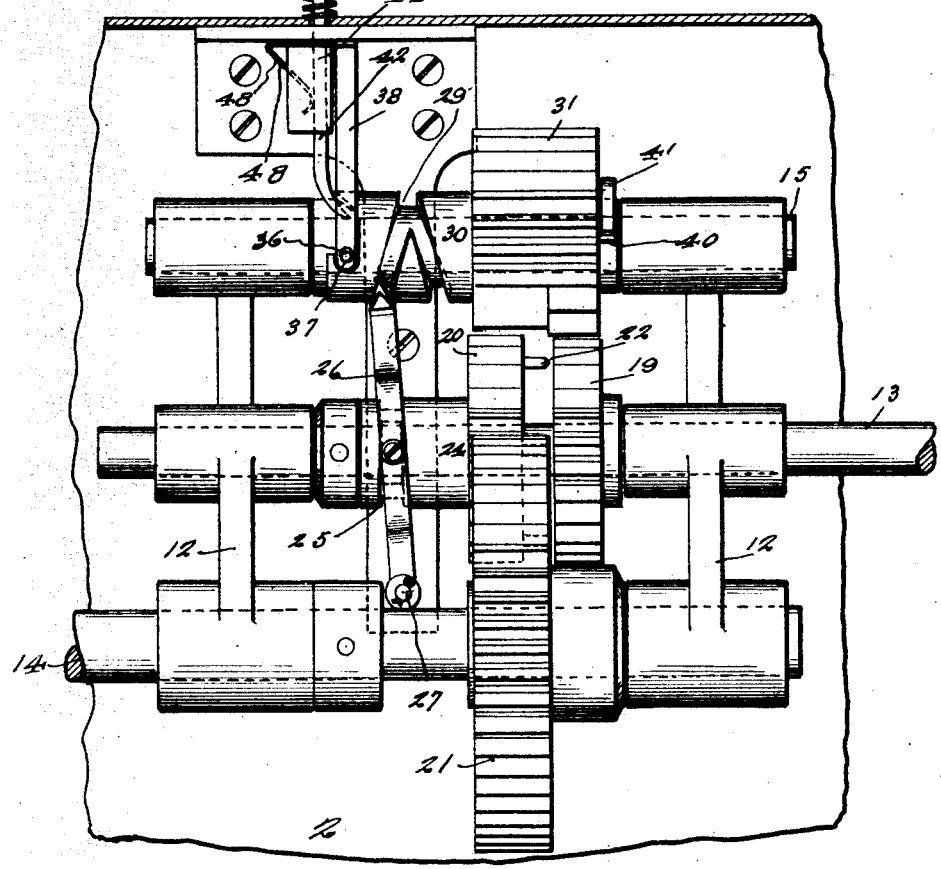
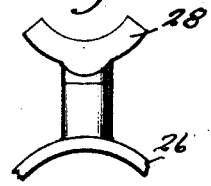
James S. Miller INVENTOR Dec. 18, 1928.
J. S. MILLER
1,696,049
GEAR SHIFT
Filed Nov. 21, 1927    2 Sheets-Sheet 2
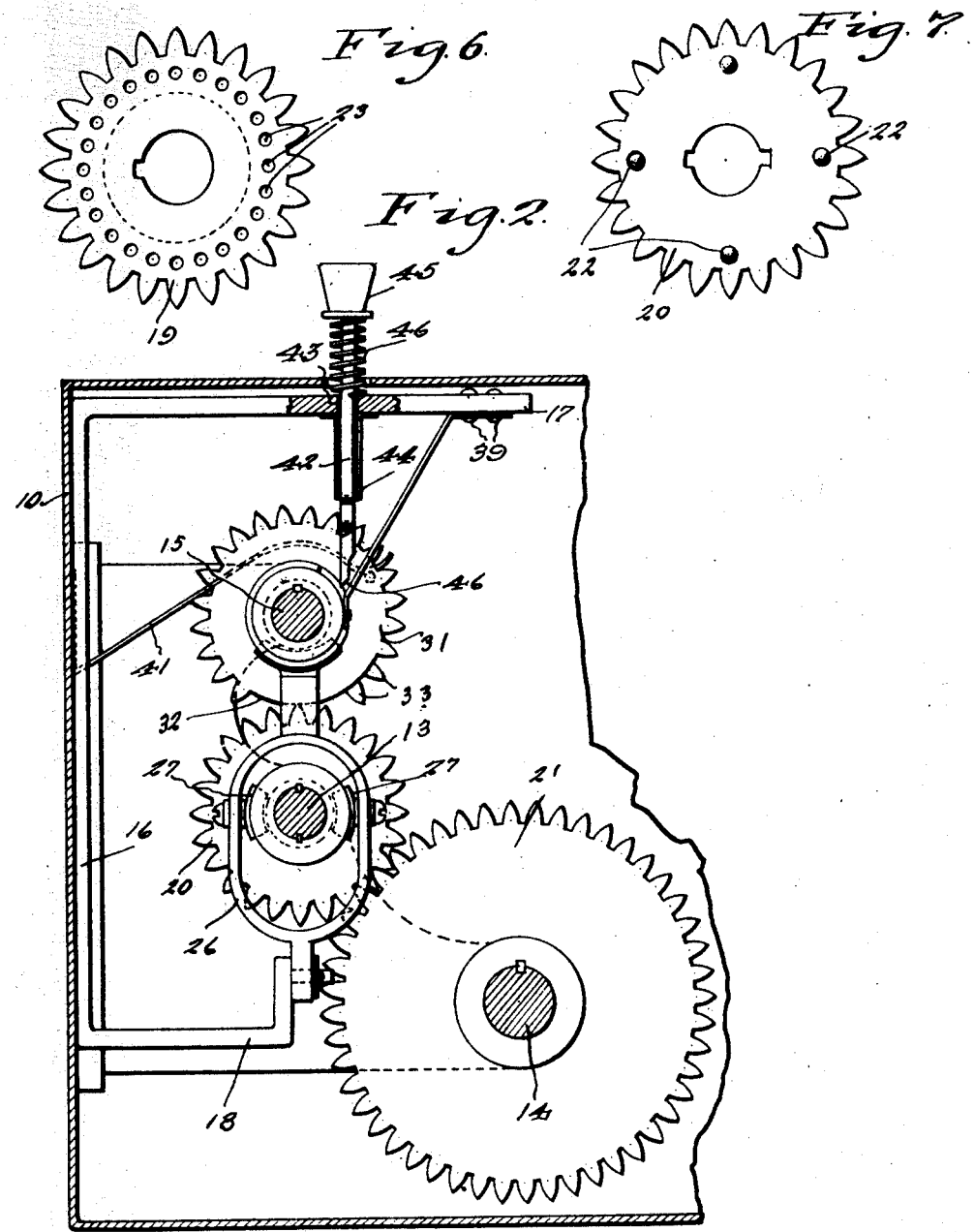
James S. Miller
INVENTOR
BY Victor J. Evans
ATTORNEY
WITNESS:

Patented Dec. 18, 1928.

1,696,049

UNITED STATES PATENT OFFICE.

JAMES S. MILLER, OF BEDFORD, INDIANA.

GEAR SHIFT.

Application filed November 21, 1927. Serial No. 234,832.

This invention relates to improvements in gear shifting mechanisms and has for an object the provision of means for transferring power from a drive to a driven shaft in such manner that the latter may be operatively associated with, or disassociated from the former while the drive shaft is in motion, the present invention being an improvement upon an application filed by me January 27, 1927, Serial No. 164,084, and allowed August 22, 1927.

The primary object of the present invention is the provision of means for imparting positive initial movement to the mechanism when a transfer of power is desired, so that the proper operation of the mechanism will be assured.

Another object of the invention is the provision of a mechanism of this character which may be duplicated to provide for different speed changes so that the invention may be used as a power transmission mechanism for automobiles, and for other uses where changes of speed ratio are desired.

With the above and other objects in view, the invention further includes the following novel features and details of construction, to be hereinafter more fully described, illustrated in the accompanying drawings and pointed out in the appended claims.

In the drawings:—

Figure 1 is a fragmentary elevation partly in section illustrating the invention in its normally inactive position.

Figure 2 is a sectional view taken substantially on the line 2—2 of Figure 1.

Figure 3 is an elevation of the idler gear and its hub.

Figure 4 is an end view of the same.

Figure 5 is a fragmentary elevation of one end of the shifting lever.

Figure 6 is an end view of one of the drive shaft gears.

Figure 7 is a like view of the other gear of the drive shaft.

Referring to the drawings in detail wherein like characters of reference denote corresponding parts, the reference character 10 indicates a housing within which is mounted spaced bearings 12 while mounted in these bearings is a drive shaft 13, a driven shaft 14 and an idler shaft 15. Also mounted in the housing 10 is a bracket 16 which includes an upper horizontal arm 17 and a lower horizontal arm 18.

Fast upon the drive shaft 13 is a gear 19, while mounted for free rotary and longitudinal movement on the shaft 13 is a gear 20. This last mentioned gear engages a gear 21 which is fast upon the shaft 14. The gear 20 carries laterally projecting points or studs 22 and these pins or studs are adapted to enter spaced openings 23 provided in the adjacent face of the gear 19 and when the studs or pins are engaged in the openings, the gears 19 and 20 will be locked together so that the last mentioned gear will be forced to rotate with the shaft 13. The gear 20 is provided with a hub 24 and the latter has an annular groove 25 therein. A yoke-shaped lever 26 is pivotally mounted as shown at 27 to the arm 18 of the bracket 16 and this yoke carries oppositely located shoes 27 which enter the groove 25. The free end of the yoke-shaped lever 26 carries a shoe 28 and this shoe operates in a cross slot 29 which is provided in the hub 30 of a gear 31. This last mentioned gear may be fast upon the idler shaft 15, or the idler shaft may be stationary and the gear 31 free to rotate thereon.

The gear 31 is of the mutilated type in that it has certain of its teeth omitted so as to provide a space 32, while certain of the teeth 33 extend only a portion of the way across the face of the gear. The teeth 33 are located substantially in a line with but disengaged from the teeth of the gear 19, while the space 32 of the gear 31 is positioned adjacent the gear 20 so that the latter may rotate within this space without engaging the teeth of the gear 31.

The hub 30 of the gear 31 is provided with a recess 34, one wall of which forms a cam 35, while extending from the hub within this recess is a pin or stud 36. This pin or study 36 is adapted to enter an opening 37 provided in the free end of a spring arm 38, the upper end of this spring arm being secured to the arm 17 of the bracket 16 as shown at 39. When the stud is positioned within the opening of the spring arm 38, the gear 31 will be held against rotation.

The gear 31 carries a pin or study 40 which projects laterally from one end and which is engaged by the free end of a spring arm 41, the opposite end of this arm being secured to the housing 10. The arm 41 is normally under tension, so that its tendency is to rotate the gear 31 when the latter is released from the spring arm 38.

In order to affect the release of the gear 31 there is provided a plunger rod 42 which operates through an opening 43 provided in the arm 17 and is movable within a guide 44 which extends from this arm. The plunger rod carries an operating knob 45 and mounted upon the rod between this knob and the arm 17 is a spring 46 which acts to yieldingly hold the plunger rod against downward movement. The lower end of the rod 42 is provided with a pointed extremity 46 which is adapted to engage behind the spring 38 within the recess 34, so that when the plunger rod is forced downward the arm 38 will be moved outward and disengaged from the pin or stud 37.

Normally, the drive shaft 13 with its gear 19 will rotate without operating either the idler shaft 15 or the driven shaft 14. When it is desired to drive the shaft 14, the plunger rod 42 is pressed downward so as to release the gear 31 from the arm 38 as previously explained. This release will permit the spring arm 41 to impart an initial rotary movement to the gear 31 due to the tension of the arm 41. This movement is sufficient to cause the teeth of the gear 31 to engage the gear 19, whereupon the gear 31 will be driven by the operation of the gear 19. Operation of the gear 31 will, through the engagement of the shift lever 26 with the hub of this gear, cause the said lever to move inward toward the gear 20 so that this last mentioned gear will be moved longitudinally of its shaft to force the pins 22 into the openings 23, whereupon the gears 19 and 20 will be locked together. As the gear 20 engages the gear 21, motion will be imparted to the last mentioned gear and consequently to the shaft 14. As soon as the lever 26 has completed its pivotal movement toward the gears, the gear 31 will have made one complete revolution so that its mutilated portion or space 32 between the teeth will be again positioned to release the gear 31 from the gear 20. At this point, the pin 36 will be positioned to again enter the opening 37 of the spring arm 38 so as to lock the gear 31 against movement. During rotation of the gear 31, the pointed end of the plunger rod 42 will travel around a shoulder 47 provided in the hub 30, the cam portion 35 forcing the plunger rod 42 laterally outward against the action of a spring 48. When a complete rotation of the shaft has been made, the spring 48 will act to force the plunger rod 42 into the recess 34 so that the parts will be ready for the next operation. When it is desired to disengage the shaft 13 from the shaft 14, the operation just described is completed except that the shaft lever 26 will move in a reverse direction.

The invention is susceptible of various changes in its form, proportions and minor details of construction and the right is herein reserved to make such changes as properly fall within the scope of the appended claims.

Having described the invention what is claimed is:—

1. In combination, a drive shaft, a driven shaft, an idler shaft, a normally inactive gear upon the idler shaft, means to lock the gear in inactive position, means to release the gear, a gear fast upon the drive shaft and normally disengaged from the gear upon the idler shaft, a gear fast upon the driven shaft, a second gear freely mounted upon the drive shaft and engaging the gear of the driven shaft and normally disengaged from the gear of the idler shaft, means to impart a positive initial rotary movement to the idler shaft gear to engage the latter with the gear fast upon the drive shaft to drive the idler gear, means operated by the idler gear to move the freely mounted gear of the drive shaft when the gear locking means is released and cause the idler gear to engage and rotate with the gear fast upon said drive shaft to operate the driven shaft, and means to lock the parts in position at the end of a complete revolution of the idler gear.

2. In combination, a drive shaft, a driven shaft, an idler shaft, a normally inactive gear upon the idler shaft, means to lock the gear in inactive position, means to release the gear, a gear fast upon the drive shaft and normally disengaged from the gear upon the idler shaft, a gear fast upon the driven shaft, a second gear freely mounted upon the drive shaft and engaging the gear of the driven shaft but normally disengaged from the gear of the idler shaft, a normally tensioned spring member engaging the gear of the idler shaft to impart a positive initial rotary movement to the idler shaft gear to engage the latter with the gear fast upon the drive shaft and drive the idler shaft gear, means operated by the idler shaft gear to move the freely mounted gear of the drive shaft when the gear locking means is released and cause the idler gear to engage and rotate with the gear fast upon said drive shaft and operate the driven shaft, and means to lock the parts in position at the end of a complete revolution of the idler shaft gear.

3. In combination, a drive shaft, a driven shaft, an idler shaft, a normally inactive gear upon the idler shaft, means to lock the gear in inactive position, means to release the gear, a gear fast upon the drive shaft, and normally disengaged from the gear upon the idler shaft, a gear fast upon the driven shaft, a second gear freely mounted upon the drive shaft and engaging the gear of the driven shaft but normally disengaged from the gear of the idler shaft, a normally tensioned spring arm having one of its ends engaging the idler shaft gear to impart an initial rotary movement to said gear and engage the same with the gear fast upon the drive shaft and drive the idler shaft gear, means operated by the idler shaft gear to move the freely mounted gear of the drive shaft when the gear locking means is released and cause the idler gear to engage and rotate with the gear fast upon said drive shaft and operate the driven shaft and means to lock the parts in position at the end of a complete revolution of the idler shaft gear.

4. In combination, a drive shaft, a driven shaft, a normally inactive idler shaft, a gear mounted upon said shaft, a spring arm, means to engage one end of the spring arm with the idler shaft gear to hold the latter against rotation, a spring actuated plunger rod to release the idler shaft gear, means operable upon the release of the idler shaft gear to impart an initial rotary movement to said gear, means to force the plunger rod away from the spring arm during rotation of the idler shaft gear, means operated by rotation of the idler shaft gear to operatively connect the drive shaft with the driven shaft to rotate the latter and means to hold the plunger rod in gear releasing position for a complete revolution of the idler shaft gear and to lock said idler shaft gear against further rotary movement at the completion of each revolution.

In testimony whereof I affix my signature.

JAMES S. MILLER.